H. MARTIN.
Brick-Machines.
No. 150,065.        Patented April 21, 1874.
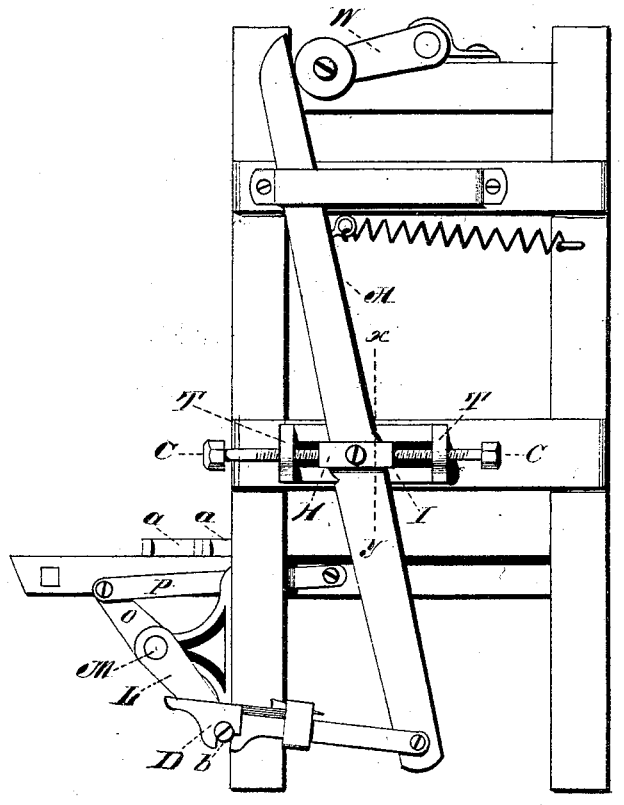
*Fig. 1*
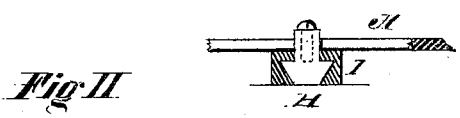
*Fig. II*
Witnesses
Inventor
Henry Martin
by his attorneys
Gardiner & Hyde

UNITED STATES PATENT OFFICE.

HENRY MARTIN, OF CHICOPEE, ASSIGNOR OF ONE-HALF HIS RIGHT TO WILLIAM C. McCLALLAN, OF SPRINGFIELD, MASSACHUSETTS.

IMPROVEMENT IN BRICK-MACHINES.

Specification forming part of Letters Patent No. 150,065, dated April 21, 1874; application filed January 27, 1873.

*To all whom it may concern:*

Be it known that I, HENRY MARTIN, of Chicopee, Hampden county, State of Massachusetts, have invented certain Improvements in Brick-Machines, of which the following is a specification:

My invention relates to improvements connected with the main lever, by which the molds, when filled, are moved from under the hoppers; and consists in the combination and arrangement, with said lever, of a movable and adjustable center for said lever, by means of which all bending of the lever, or giving of parts of the machine that would affect, through the lever or its connections, the distance which the molds are moved, can be remedied without the necessity of stopping the machine.

In the drawing, Figure I is a side elevation of a machine having my improvements, and Fig. II a detail view on line $x y$ of Fig. I.

In the patent granted me October 20, 1868, it will be seen that, when obstructions in the molds $a$ $a$, &c., prevented them from passing from under the hopper, the spring-pawl D would pull off from the pin $b$ upon the crank-arm L of the rock-shaft M, and permit the crank-arm W to clear the lever H; but in use the spring of the pawl-arm D becomes weakened and the arm practically longer, and the lever A and connections L, O, and P become sprung, which, together with movement in the frame itself, causes a continual change in the distance which the molds are moved from under the hopper, and necessitates frequent stoppages of the machine for repairs, as the action of the mechanism is perfect only when one mold is pushed a certain distance by the succeeding one coming into position under the hopper.

In order to insure this proper adjustment, and compensate for the decreased throw of the molds from the causes above mentioned without stopping the machine, I center the lever A, as shown in Fig. I, within the loop of the slide H, which moves in a track or bed, I, attached to the frame, and having the nut ends T T, through which pass set-screws C C, and bear against opposite ends of the slide H, so that any failure of the molds to entirely clear the hopper can be remedied at once by the alteration of the center of the lever A.

By this means I am able to keep a machine constantly at work, when, owing to the shortness of the brick-making season, time is of the greatest value.

Now, having described my invention, what I claim is—

In a brick-machine, the combination, with the bed I, having the nut ends T, of the adjusting-screws C C, center slide H, and lever A, substantially as and for the purpose described.

HENRY MARTIN.

Witnesses:
R. F. HYDE,
EDWARD MORRIS.